United States Patent Office 2,839,979
Patented June 24, 1958

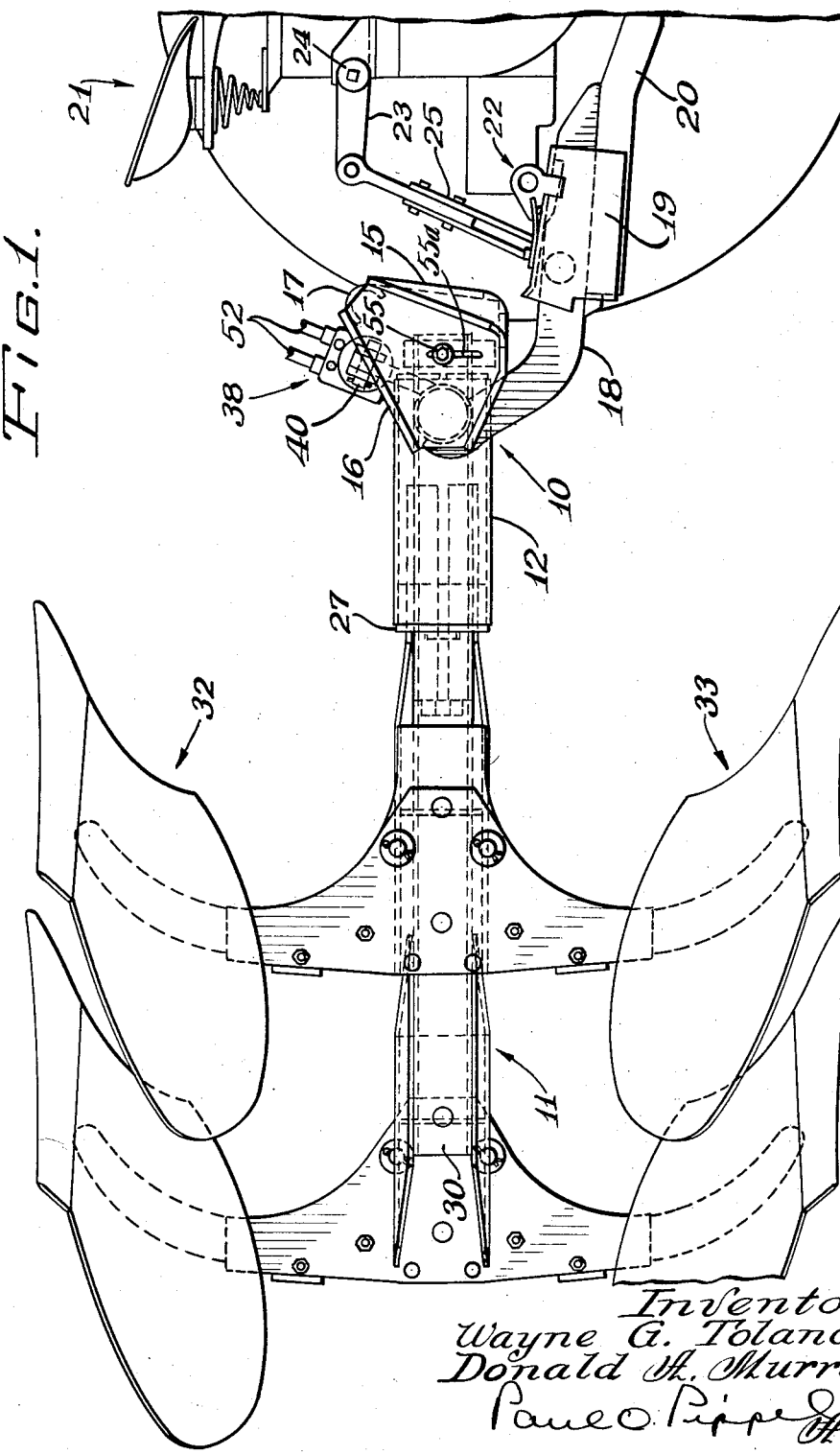

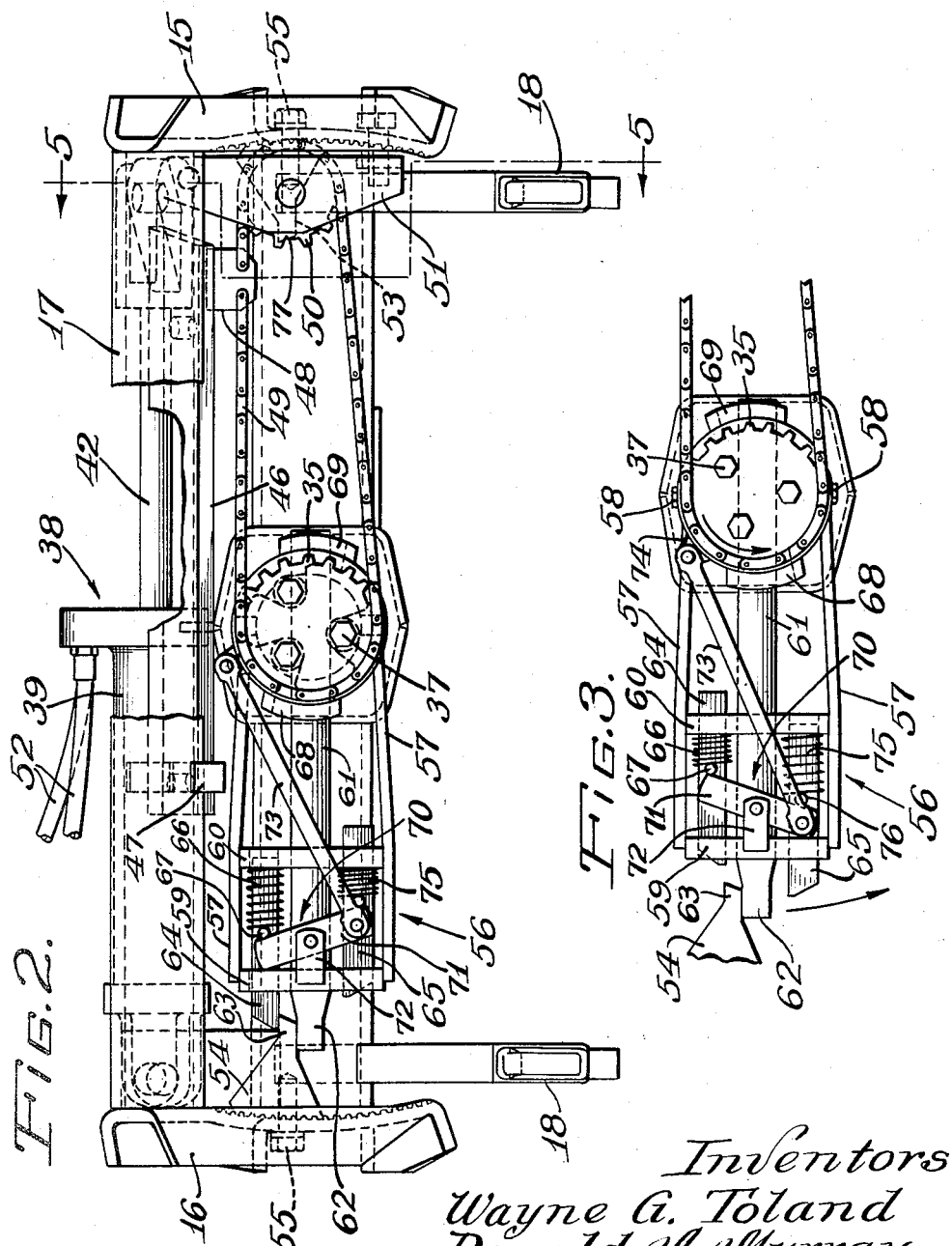

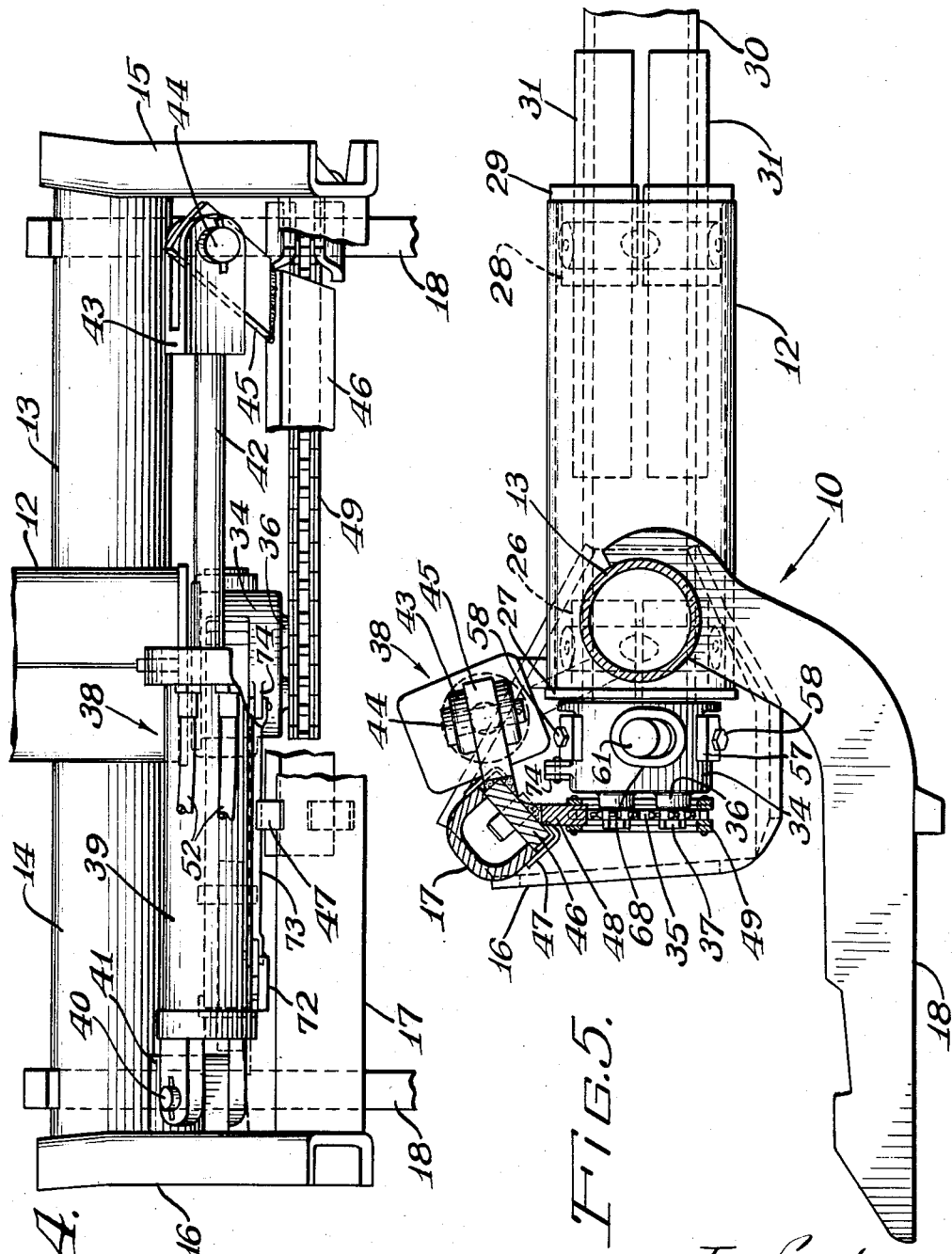

2,839,979
TWO-WAY PLOW

Wayne G. Toland and Donald A. Murray, Stockton, Calif., assignors to International Harvester Company, a corporation of New Jersey Application October 10, 1956, Serial No. 615,195

8 Claims. (Cl. 97—26)

This invention relates to two-way plows of the roll-over type and particularly to operating means therefor. More specifically the invention concerns the type of two-way plow that is rotatable about a longitudinal axis with respect to the direction of travel to alternately dispose the plow units in operation, and has for its object the provision of novel operating mechanism for rocking the plow carrier about its axis and for locking the operating plow unit in position while the other unit is held in an inoperative position.

Another object of the invention is the provision in a two-way roll-over plow of improved operating apparatus for reversing the operation of the plow units, latch means for holding the working plow unit in operating position and a latch actuating device actuated by the operating apparatus for releasing the latch means automatically.

Other objects and advantages of the invention will become clear from the following detailed description when read in conjunction with the accompanying drawings wherein:

Figure 1 is a view in side elevation of the rear end of a tractor provided with an implement-attaching structure of the two-point type and having mounted thereon a two-way plow of the roll-over type embodying the features of this invention;

Figure 2 is a front elevation of the plow of this invention detached from the tractor, with parts removed, and showing the operating mechanism therefor;

Figure 3 is a detail of the latching apparatus shown in Figure 2 with the latch released so that the plow carrier can be turned to place the alternately operating plow unit in operating position;

Figure 4 is a plan view of the structure shown in Figure 2, with parts removed, and Figure 5 is a section taken on the line 5—5 of Figure 2.

The plow of this invention comprises a main supporting frame 10 and a plow-carrying subframe 11. The main frame includes a longitudinally extending tubular member 12 having affixed near its forward end and extending laterally therefrom tubular frame members 13 and 14 having affixed to the outer ends thereof generally triangularly shaped plates 15 and 16, respectively. Plates 15 and 16 are connected by a transversely extending channel-shaped brace 17. Laterally spaced prongs or shafts 18 are affixed to the laterally projecting main frame members 13 and 14 and extend forwardly therefrom for sliding reception in a pair of elongated socket members 19, only one of which is shown, affixed to the end of a drawbar 20, forming a part of the implement-attaching structure of a tractor 21. Although the implement-attaching structure of the tractor forms no part of this invention, it might be briefly noted that the prongs 18 are held in their respective sockets 19 by a locking device, indicated at 22, of a well-known type and that the drawbar 20, as well as the implement connected thereto, is vertically moved between operating and transport positions on the tractor by power operated means including a lift arm 23 mounted on a rockshaft 24 carried by the tractor and connected by a link 25 to each of the socket members 19.

The central longitudinally extending portion 12 of the main support or frame 10 is provided at its forward end with a bearing 26 having a flange 27 on the outside and engaging the tubular frame portion 12. A rear bearing 28 is received in the rear end of tubular member 12 and is also provided with a flange 29 engaging the rim of the tube.

The tool carrier or subframe 11 is in the form of an elongated tubular beam 30, the forward end of which is rotatably receivable in tubular member 12, being separated therefrom at its forward end by the front bearing 26 and spaced from bearing 28 by steel inserts 31 affixed to beam 30.

The tool beam 30 has mounted thereon left and right-hand plow units 32 and 33, respectively, spaced 180° apart and adapted for rotation about the axis of frame member 12 and tool beam 30 to place the alternately operating plow unit in operating position while the other is moved to an inoperative position.

The forward end of the plow carrier or subframe 11 extends beyond the forward end of main frame member 12 and is covered by a bell-shaped housing 34 suitably secured thereto and serving as a support for a rotatable and drivable member in the form of a sprocket wheel 35 mounted for coaxial rotation with the tool beam 30 and spaced from the face of the bell housing by a plurality of bosses 36. Sprocket wheel 35 is secured to the bell housing 34 by a plurality of bolts 37 passing through the sprocket wheel and received in threaded openings in the bosses 36. Rotation of sprocket wheel 35 thus revolves subframe 11 and the plow units 32 and 33.

Sprocket wheel 35 is driven to revolve the tool carrier by a hydraulic ram 38 comprising a cylinder 39 pivotally connected by a pin 40 to a lug 41 affixed to end plate 16. The hydraulically operated ram 38 extends transversely of the implement parallel to brace 17 and main frame members 13 and 14, and piston rod 42, slidable in cylinder 39, is provided at its end with a clevis 43 connected by a pivot pin 44 with a lug 45 secured to a transversely extending guide bar or track 46 slidable in two or more tracks 47 secured to and depending from brace 17. A lug 48 is affixed to one end of the track 46 and is suitably secured to an endless drive chain 49 trained about sprocket wheel 35 and an idler wheel 50 mounted upon a bracket 51 secured to the plate 15. Fluid under pressure is supplied to the hydraulic ram 38 through flexible hose lines 52 from a source of fluid under pressure on the tractor 21, not shown. Extension and retraction of piston rod 42 in cylinder 39 reciprocates the connector 48 on drive chain 49 and revolves the sprocket wheel 35 and subframe 11 in opposite directions to alternately place the plow units 32 and 33 in operation.

The plow carrier in the form of subframe 11 is revolved relative to main frame 10 to alternately dispose one of the plowing units in operating position while the other unit is moved to the non-operating position. Each of the plow units is locked in its operating position by latch means including latch parts 53 and 54 secured to the respective plates 15 and 16 by bolts 55, each of which is slidably receivable in a slot 55a in the end plates so that the latch parts 53 and 54 can be adjusted to level the operating plow unit.

A movable latch member 56 includes a pair of spaced straps 57 extending at right angles to the axis of the tool carrier 30 and having their inner ends secured by bolts 58 to opposite sides of the bell-shaped housing 34, each of the bolts 58 being received in a suitable slot, not shown, in the forward end of the tubular member 30 to accommodate limited rotation of the housing 34 relative to the member 30. The outer ends of straps 57 are connected by spaced braces 59 and 60 to which is affixed an elongated latch bar 61 having its outer reduced end 62 engaging the undersurface of a latch projection 63 on latch part 54, as viewed in Fig. 2. The engagement of part 62 with projection 63 prevents rotation of the plow carrier 11 in one direction.

Braces 59 and 60 are apertured to slidably receive a pair of latch plungers 64 and 65 on opposite sides of member 61, and a spring 66 surrounding plunger 64 engages brace 60 at one end and a pin 67 at the other to urge the plunger 64 outwardly in a direction to engage the other side of projection 63 on latch part 54, on the side of projection 63 opposite the part 62. In the position shown in Figure 2 the projection 63 is thus firmly gripped to prevent rotation of the plow carrier 11 in either direction. The inner end of rod 61 passes through the forward end of tubular member 30 to rotate therewith and is received in slotted ears 68 and 69 in the bell housing 34 to accommodate rotational movement of housing 34 relative to the bar 61 while housing 34, as pointed out above, is allowed limited rotation relative to member 30 by virtue of the slotted connection of bolts 58 thereto.

Latch release means 70 includes a crosshead 71 pivotally mounted on a lug 72 affixed to brace 59 and to one end of which is connected an actuating rod 73, the other end of which is pivotally connected to a pair of lugs 74 secured to the bell housing 34. In the position of the parts shown in Figure 2, both of the latch parts 62 and 64 are in locking position relative to the part 63 on the plow frame, so that the tool carrier is held against rotation. Upon actuation of the hydraulic ram 38 to retract the piston rod 42 in the cylinder, the connector 48 moves to the left, rotating sprocket wheel 35 to bell housing 34 in a counter-clockwise direction. Force is thus exerted through actuating rod 73 to rock the crosshead 71 and retract latch plunger 64. By virtue of the slotted connection of straps 57 and housing 34 to the front end of beam 30, and the slotted connection of bar 61 to housing 34, the latch release means 70 is actuated first and then the further operation of the hydraulic ram 38 rocks the tool carrier about its axis in the direction of the arrows in Figure 3, latch plunger 65 being extended under the action of a spring 75 engaging brace 60 and a pin 76.

Continued rotation of the tool-carrying subframe 11 carries bodily with it the latch member 56 which swings around the axis of the carrier 11 to its alternate position in latching relation with latch part 53, the slanted outer edge of latch plunger 65 sliding over the projection 77 and being urged by spring 75 into locking position with respect thereto. Provision is thus made for releasably locking the plow-carrying subframe 11 in the operating position of either of the plow units 32 and 33.

It is believed that the operation of the two-way rollover plow of this invention will be clearly understood from the foregoing description. It should likewise be understood, however, that the invention has been described in its preferred embodiment only, and that modifications may be made in the invention without departing from the spirit thereof or the scope of the appended claims.

What is claimed is:

1. In a two-way plow, a support, a plow carrier mounted on the support and rotatable about a longitudinal axis to alternately dispose the plows in operation, drive means extending between the support and the carrier for rocking the latter in opposite directions to positions for right and left-hand plowing, single releasable latch means mounted on the carrier for rotation therewith and cooperable with the support to lock the carrier in either operating position thereof, and link means connected to the carrier and to the latch means operative in either position of the latch means to release the latter and accommodate rotation of the carrier.

2. The invention set forth in claim 1, wherein there is lost motion provided in the mounting of the latch means on the carrier and a predetermined limited rotation of the carrier occurs to accommodate release of said latch means prior to rotation of the latch means with the carrier.

3. In a two-way plow, a support, a plow carrier mounted on the support and rotatable about a longitudinal axis to alternately dispose the plows in operation, drive means extending between the support and the carrier for rocking the latter in opposite directions to positions for right and left-hand plowing, single releasable latch means mounted on the carrier for rotation therewith and cooperable with the support to lock the carrier in either operating position thereof, and link means connected to the carrier and to the latch means operative in either position of the latch means to release the latter and accommodate rotation of the carrier, said drive means including a rotatable member mounted on the carrier and drive means therefor, and a slotted connection between said latch means and said rotatable member adapted to accommodate limited initial rotation of said member prior to rotation of the latch means.

4. In a two-way plow of the type having right and left-hand plowing units mounted on a subframe rotatable about a longitudinal axis with respect to the direction of travel to dispose said plow units in alternate operating positions, a main frame rotatably supporting said subframe, and means for rotating the subframe, comprising a rotatable member mounted on the subframe coaxially therewith, a drive member operatively connected to said rotatable member, a hydraulic ram mounted at one end on the main frame, means connecting the other end of the ram to said drive member, said connecting means being reciprocable by the operation of the ram to drive said drive member and revolve the subframe between said alternate operating positions, a pair of latch parts on the main frame, a latch member mounted on the subframe alternately rotatable therewith between positions in cooperative relation with said latch parts, means operatively connecting said rotatable member to said latch member for alternately revolving the latter to latch positions with respect to said latch parts to hold the plow units in their respective operating positions, and additional means connecting said rotatable member to said latch member for unlocking the subframe upon rotation of said rotatable member.

5. In a two-way plow of the type having right and left-hand plowing units mounted on a subframe rotatable about a longitudinal axis with respect to the direction of travel to dispose said plow units in alternate operating positions, a main frame rotatably supporting said subframe, and means for rotating the subframe, comprising a rotatable member mounted on the subframe coaxially therewith, an idler wheel on the main frame, a drive member trained around said rotatable member and said wheel, a hydraulic ram mounted at one end on the main frame, means connecting the other end of the ram to said drive member, said connecting means being reciprocable by the operation of the ram to drive said drive member and revolve the subframe between said alternate operating positions, a pair of latch parts on the main frame, a latch member mounted on the subframe alternately rotatable therewith between positions in cooperative relation with said latch parts, means operatively connecting said rotatable member to said latch member for alternately revolving the latter to latch positions with respect to said latch parts to hold the plow units in their respective operating positions, latch release means carried by said latch member for unlocking the subframe to accommodate rotation thereof, and link means connecting said rotatable member to said latch release means for releasing the latter in response to rotation of said rotatable member to revolve the subframe.

6. In a two-way plow of the type having right and left-hand plowing units mounted on a subframe rotatable about a longitudinal axis with respect to the direction of travel to dispose said plow units in alternate operating positions, a main frame rotatably supporting said subframe, and means for rotating the subframe, comprising a rotatable member mounted on the subframe coaxially and for rotation therewith, a drive member operatively connected to said rotatable member, a hydraulic ram mounted at one end on the main frame, means connecting the other end of the ram to said drive member, said connecting means being reciprocable by the operation of the ram to drive said drive member and revolve the subframe between said alternate operating positions, a pair of latch parts on the main frame, a latch member mounted on the subframe alternately rotatable therewith between positions in cooperative relation with said latch parts, means operatively connecting said rotatable member to said latch member for alternately revolving the latter to latch positions with respect to said latch parts to hold the plow units in their respective operating positions, latch release means carried by said latch member for unlocking the subframe to accommodate rotation thereof, and link means connecting said rotatable member to said latch release means for releasing the latter in response to rotation of said rotatable member to revolve the subframe, the connection of said rotatable member to said latch member including lost motion accommodating release of said latch means by said link means prior to rotation of the latch member with the subframe.

7. In a two-way plow of the type having right and left-hand plowing units mounted on a subframe rotatable about a longitudinal axis with respect to the direction of travel to dispose said plow units in alternate operating positions, a main frame rotatably supporting said subframe, and means for rotating the subframe, comprising a rotatable member mounted on the subframe coaxially for rotation therewith, a drive member operatively connected to said rotatable member, a hydraulic ram mounted on one end on the main frame, means connecting the other end of the ram to said drive member, said connecting means being reciprocable by the operation of the ram to drive said drive member and revolve the subframe between said alternate operating positions, a pair of latch parts on the main frame, a latching device mounted on the subframe alternately rotatable therewith between positions in cooperative relation with said latch parts, said latching device having means movable into and out of latching relation with the respective of said latch parts on the main frame, and means for operating said latching device comprising an actuating member connecting said latching device to said rotatable member and operative upon rotation thereof to release said latching device.

8. The invention set forth in claim 7, wherein said latching device includes a pair of movable members, one of which is retractable to release it from latching relation with one of said latch parts on the main frame and the other of which is simultaneously extensible to dispose it in position for latching relation with the other of said latch parts.

References Cited in the file of this patent
UNITED STATES PATENTS

| | | |
|---|---|---|
| 2,633,788 | Nelson | Apr. 7, 1953 |
| 2,666,376 | Pursche | Jan. 19, 1954 |
| 2,698,563 | Edwards | Jan. 4, 1955 |
| 2,714,345 | Wilkerson et al. | Aug. 2, 1955 |